(12) United States Patent
Hartkopp et al.

(10) Patent No.: US 10,389,744 B2
(45) Date of Patent: Aug. 20, 2019

(54) ATTACK DETECTION METHOD, ATTACK DETECTION DEVICE AND BUS SYSTEM FOR A MOTOR VEHICLE

(71) Applicant: VOLKSWAGEN AKTIENGESELLSCHAFT, Wolfsburg (DE)

(72) Inventors: Oliver Hartkopp, Wolfsburg (DE); Thorben Moos, Bochum (DE)

(73) Assignee: Volkswagen Aktiengesellschaft (DE)

( * ) Notice: Subject to any disclaimer, the term of this patent is extended or adjusted under 35 U.S.C. 154(b) by 28 days.

(21) Appl. No.: 15/560,835

(22) PCT Filed: Mar. 15, 2016

(86) PCT No.: PCT/EP2016/055610
§ 371 (c)(1),
(2) Date: Sep. 22, 2017

(87) PCT Pub. No.: WO2016/156034
PCT Pub. Date: Oct. 6, 2016

(65) Prior Publication Data
US 2018/0115575 A1    Apr. 26, 2018

(30) Foreign Application Priority Data
Mar. 30, 2015    (DE) .................. 10 2015 205 670

(51) Int. Cl.
*H04L 29/06* (2006.01)
*H04L 12/40* (2006.01)
*H04L 29/08* (2006.01)

(52) U.S. Cl.
CPC .......... *H04L 63/1425* (2013.01); *H04L 12/40* (2013.01); *H04L 63/1408* (2013.01); *H04L 67/12* (2013.01); *H04L 2012/40273* (2013.01)

(58) Field of Classification Search
CPC . H04L 63/1425; H04L 12/40; H04L 63/1408; H04L 2012/40273; H04L 67/12
See application file for complete search history.

(56) References Cited

U.S. PATENT DOCUMENTS 5,134,704 A * 7/1992 Leuty ................. H04Q 11/0407
370/216
6,157,971 A * 12/2000 Gates .................. G06F 13/4217
710/1

(Continued)

FOREIGN PATENT DOCUMENTS

DE        19651518 A1    7/1997
DE    102011084254 A1    4/2013

(Continued)

OTHER PUBLICATIONS

Larson et al., An Approach to Specification-based Attack Detection for In-Vehicle Networks, IEEE Intelligent Vehicles Symposium, Eindhoven University of Technology, Jun. 4-6, 2008, Eindhoven, The Netherlands, pp. 220-225.

(Continued)

*Primary Examiner* — Meng Li
(74) *Attorney, Agent, or Firm* — Barnes & Thornburg LLP (57) ABSTRACT

An attack detection method for a bus system of a motor vehicle, wherein communication rules for transmitting messages are determined for the bus system. The detection method includes receiving messages, which are sent via the bus system, and analyzing whether the received messages are received according to the communication rules.

36 Claims, 7 Drawing Sheets

(56) References Cited

U.S. PATENT DOCUMENTS

| | | |
|---|---|---|
| 8,561,167 B2 | 10/2013 | Alperovitch et al. |
| 8,712,596 B2 | 4/2014 | Scott |
| 2005/0086520 A1 | 4/2005 | Dharmapurikar et al. |
| 2008/0195914 A1 | 8/2008 | Lee |
| 2014/0250531 A1 | 9/2014 | Moeller et al. |
| 2015/0066239 A1* | 3/2015 | Mabuchi ............ H04L 63/1408 701/1 |

FOREIGN PATENT DOCUMENTS

| | | |
|---|---|---|
| DE | 102012222483 A1 | 6/2013 |
| DE | 102014001498 A1 | 10/2014 |
| EP | 1435154 A2 | 7/2004 |
| EP | 2139199 A2 | 12/2009 |
| EP | 2701132 A1 | 2/2014 |
| WO | 2011152908 A1 | 12/2011 |
| WO | 2013093591 A1 | 6/2013 |

OTHER PUBLICATIONS

Müter et al., Entropy-Based Anomaly Detection for In-Vehicle Networks, IEEE Intelligent Vehicles Symposium, Jun. 5-9, 2011, Baden Germany, pp. 1110-1115.

Search Report for German Patent Application No. 10 2015 205 670.8; dated Mar. 16, 2016.

Search Report for International Patent Application No. PCT/EP2016/055610 dated May 20, 2016.

* cited by examiner

ATTACK DETECTION METHOD, ATTACK DETECTION DEVICE AND BUS SYSTEM FOR A MOTOR VEHICLE

PRIORITY CLAIM

This patent application is a U.S. National Phase of International Patent Application No. PCT/EP2016/055610, filed 15 Mar. 2016, which claims priority to German Patent Application No. 10 2015 205 670.8, filed 30 Mar. 2015, the disclosures of which are incorporated herein by reference in their entireties.

SUMMARY

Illustrative embodiments relate to an attack detection method for a bus system of a motor vehicle, an attack detection device for a bus system of a motor vehicle and a bus system for a motor vehicle.

BRIEF DESCRIPTION OF THE DRAWINGS

Example embodiments will now be described with reference to the attached drawing, in which.

DETAILED DESCRIPTION

In the last few decades, motor vehicles have been equipped with more and more electronic components along with purely mechanical components. These electronic components may also contain embedded computers. Electronic components are, for example, sensor units for measuring speed, rotational speed, etc., control devices (anti-lock braking system, electronic stability program, engine control unit, etc.), multimedia devices (radio, CD player, navigation device, etc.) and the like.

Various bus systems are known for the communication of electronic components of this type in a motor vehicle, such as, for example, the very well known and widespread CAN (Controller Area Network) bus. In addition, however, other bus systems also exist which are similarly used in automobile manufacture, such as LIN (Local Interconnect Network), FlexRay, MOST (Media Oriented Systems Transport), PSI5 (Peripheral Sensor Interface 5), the Ethernet known from the computing domain and the like.

Bus systems in the automotive sector have increasingly become the focus of attention for hacker attacks and attempts to deliberately manipulate content on the CAN network or the other networks. Such hacker attacks on the bus system are typically carried out by accessing an OBD (On-Board Diagnostic) socket or by a direct physical connection to the bus system lines.

Cybersecurity of vehicles is discussed in the media and in development circles. In the SAE ("Society of Automotive Engineers"), a working party already exists which is examining cybersecurity of vehicles and is monitoring current developments in manipulations of vehicle electronics and is looking for ways to prevent them.

Various solutions are known in the prior art for detecting, containing or preventing hacker attacks on a bus system, e.g., the CAN bus.

It is known, for example, to integrate a type of firewall into the CAN bus so that, for example, a hacker attack via the OBD socket or an infotainment system on sensitive control units (drive unit, steering or the like) is prevented due to the firewall. However, the firewall can be bypassed, for example, by contacting the bus line to the firewall.

Another alternative is to encrypt the message traffic on the bus, wherein concepts of this type are complex and expensive due to the use of encryption techniques, and require additional processing time.

Furthermore, a defined specification can be provided for the bus system and can be kept secret ("security by obscurity"), such as, e.g., a "CAN ID hopping" or the like, so that a potential attack is detectable since it does not adhere to this secret specification. The drawback here is that absolute secrecy is difficult to achieve, and security is no longer guaranteed in the event of a breach of the secrecy.

In the case of the CAN bus, CRC-based methods are also known in which manipulated messages can be detected via checksums. Furthermore, a cryptographic authentication of CAN messages (e.g., MaCAN concept) and the like are known. Methods of this type are also comparatively complex and expensive.

Attack detection systems, also referred to as "Intrusion Detection Systems" ("IDS"), are essentially known. In the computing or grid domain, for example, the two U.S. Pat. No. 8,561,167 B2 and U.S. Pat. No. 8,712,596 B2 show the use of IDS for detecting malicious attacks.

In the CAN bus domain, it is furthermore known for attacks to be detected with self-learning algorithms which can detect anomalies in message traffic, for example, by comparing a current message volume with an average volume which they have "learned" in the past. Neural networks are also used for this purpose. The drawback of such methods is that the reason for the anomaly cannot be detected. If, for example, the vehicle is in an unstable exceptional driving state, the message volume in the CAN bus is also unusually high. This would be incorrectly detected by an algorithm of this type as an anomaly which is based on an attack and not on an unusual driving state. False reports of this type are also referred to as "false positives".

On the whole, the prior art has the drawback that a substantial hardware and/or software investment is required, wherein the accuracy in the detection of genuine attacks on the vehicle network is not optimal. As mentioned, vehicle states which are reached in the borderline area can therefore result in an erroneous detection of an attack, which could theoretically result in the shutdown of important functions of the vehicle.

Disclosed embodiments provide an attack detection method, an attack detection device and a bus system for a motor vehicle which at least partially overcome the aforementioned drawbacks.

Disclosed embodiments provide an attack detection method, an attack detection device, and a bus system for a motor vehicle.

According to a first disclosed embodiment, an attack detection method for a bus system of a motor vehicle, wherein communication rules for the transmission of messages are defined for the bus system, comprises:

receiving messages which are sent via the bus system; and
analyzing whether the received messages are received according to the communication rules.

According to a second disclosed embodiment, an attack detection device for a bus system for a motor vehicle with a microprocessor is configured to receive messages via the bus system and the microprocessor is configured to carry out the method according to the first disclosed embodiment.

According to a third disclosed embodiment, a bus system for a motor vehicle has at least one bus line and a plurality of bus participants which exchange messages with one another via the bus line, wherein at least one bus participant is configured to carry out the method according to the first disclosed embodiment.

Some example embodiments relate to an attack detection method for a bus system of a motor vehicle, wherein communication rules for the transmission of messages are defined for the bus system. The attack detection method comprises:

receiving messages which are sent via the bus system; and
analyzing whether the received messages are received according to the communication rules.

The bus system for the motor vehicle can essentially be any known bus system, such as the widespread CAN (Controller Area Network) bus. In addition, however, other bus systems also exist which are similarly used in automobile manufacture, such as the aforementioned LIN (Local Interconnect Network), FlexRay, MOST (Media Oriented Systems Transport), PSI5 (Peripheral Sensor Interface 5), the Ethernet known from the computing sector and the like.

The disclosed embodiments are essentially described below with reference to the CAN bus system, without being restricted thereto. However, the example embodiments described below are also applicable to other bus systems, such as those mentioned above by way of example.

The communication rules are defined, for example, in a specification for the bus system, for example, as a communication protocol or the like. In the automotive sector, it is customary for an (often confidential) specification to be provided for the bus system that is used, in which the communication behavior for the bus system and the associated units are defined (specified). The same applies to the CAN bus, for which there are corresponding CAN specifications, as is also known to the person skilled in the art. Since specifications of this type are essentially known to the person skilled in the art and are accessible to him, a detailed description of such specifications is foregone below.

The bus system itself has physical lines which are designed, for example, as copper lines or optical fibers or the like, which are installed accordingly in the vehicle and are connected to the units ("bus participants"). The bus system may essentially have any type of topology (ring-shaped, star-shaped, linear or combined forms or the like). In the case of the CAN bus, it is designed as a bilaterally terminated line structure.

Messages are transmitted, for example, as message signals, via the bus system by the bus participants (e.g., control units, switches, infotainment systems, navigation systems, multimedia devices and the like) connected thereto. Messages of this type may contain an ID, i.e., a unique identifier, which, for example, is uniquely allocated to a transmitter, and they may have a useful content ("payload"). The messages may also have an "object identifier", as is typically the case with the CAN bus, which characterizes the content of the message (in the case of the CAN bus, the messages are also referred to as telegrams). A transmitter may transmit different messages with different object identifiers and the receivers connected to the bus system decide on the basis of the object identifier whether the message is relevant to them or not. In some example embodiments, a restriction is provided in the CAN bus that a transmitter is allowed to transmit different messages with different object identifiers, but there is only ever one transmitter for a specific object identifier. This allows an arbitration of messages, as is known to the person skilled in the art, for example, for the CAN bus.

In some example embodiments, for example, a communication matrix exists which may also be a component of the communication rules for the bus system, wherein, for example, all object identifiers with the associated transmitters and receivers are defined in the communication matrix.

The attack detection method then further comprises the receiving of messages which are sent (dispatched) via the bus system. For example, all messages which are sent via the bus system are received, or only some of the messages. The reception of the messages may essentially take place centrally, as is typically the case with a network-based implementation of the attack detection method, or locally, e.g., in each bus participant, as in the case of a host-based implementation of the attack detection method, or via combined forms of central and host-based reception.

The attack detection method furthermore comprises analyzing whether the received messages are received according to the communication rules.

Since the communication rules are known and the communication behavior for the bus system is prescribed, a deviation from the communication rules can indicate an attempted attack or, for example, a malfunction of a bus participant. An attack detection of this type is also referred to as "intrusion detection", and an associated device or an associated program is also referred to as an "intrusion detection system".

In some example embodiments, the exact communication rules are learnt by corresponding algorithms, neural networks or the like, wherein the essential communication protocols used for the bus system, such as, for example, OSEK-COM, AUTOSAR SWS CON are predefined.

No learning phase is necessary with the disclosed attack detection method, as is necessary, for example, with the self-learning algorithms in the prior art. The present method may furthermore be hard-coded in a program, since the communication rules are known and are also typically unmodifiable, as a result of which, for example, an efficient implementation in an embedded system is possible. On the whole, a high accuracy in the detection of attempted attacks is associated with the method, i.e., a rate of 0% of false reports ("false positives") is theoretically possible. Moreover, knowledge of the attack detection method does not help a potential attacker any further, since attempts by an attacker to bypass the disclosure are detected on the basis of the necessary deviation from the prescribed communication rules. The disclosed embodiments can therefore be generated from existing communication rules, such as OEM specifications for a corresponding bus system, in a secure process. The low error detection rate also enables the use in some example embodiments of an attack detection method of this type to deactivate safety-critical functions (e.g., relating to intrinsic safety) if a (hacker) attack is detected. The high and robust detection performance can also be used for service purposes to render previous manipulations on vehicle networks (vehicle bus systems) detectable during a workshop visit, e.g., through online diagnostics. It is furthermore possible to identify bus participants which are not transmitting according to the communication rules and therefore, for example, are defective or are not designed in accordance with the specifications. This may also be helpful in the development of a bus participant (e.g., a control unit).

Measures can furthermore be taken due to the reliable attack detection, such as, e.g.:
  deactivating sensitive networked functions (ACC, Lane-Assist, etc.),
  activating cryptographic measures on demand,
  retaining detected attacks for evaluation in customer service,
  hacker play protection to prevent (e.g., media-effective) attacks.

In some example embodiments, different communication rules are defined for different message types and (only) messages of a specific message type are analyzed. As already mentioned above, for example, in the case of the CAN bus, every message has an object identifier to indicate the message type (e.g., temperature value, pressure value, voltage value, etc.). By examining, for example, specific message types only, e.g., on the basis of their object identifier, the analysis effort can be reduced on the whole and can be focused, for example, on message types relating to safety-critical message content (e.g., braking pressure, steering angle or the like).

In some example embodiments, the communication rules predefine a fixed message transmission cycle and the analysis determines whether the messages have been received according to the fixed message transmission cycle. In some example embodiments, different message cycles are predefined for different message types. A message cycle describes the (e.g., fixed) time intervals in which a message is transmitted, wherein, for example, a specific tolerance limit can be provided which is taken into account in the analysis to determine whether a deviation from the message cycle has occurred. The monitoring of the message cycle is a comparatively simple criterion for the monitoring and can therefore be implemented simply and economically. An attempted attack which does not know or take account of the message cycle and therefore dispatches messages outside the message cycle can therefore be simply detected.

In some example embodiments, the communication rules predefine a blocking time between two consecutive messages and the analysis determines whether two consecutive messages are received according to the predefined blocking time. A blocking time of this type, also referred to as an "inhibit time", can be provided to avoid an overload of the bus system. Furthermore, an attempted attack, for example, in which messages are transmitted according to a predefined message cycle, but within the blocking time, can be detected.

In some example embodiments, the analysis additionally determines whether the message content of two consecutive messages is identical. The message content may vary, for example, depending on specific events (e.g., messages from the ABS control unit during sharp braking or the like). An attempted attack in which, for example, only identical messages are transmitted, can therefore be detected.

In some example embodiments, the communication rules predefine a message cycle changeover depending on a predefined event and the analysis determines whether the received messages are received according to the predefined message cycle changeover. Message cycle changeovers of this type occur, for example, to indicate a change of state (e.g., light on/off, etc.). If the message cycle is restarted following a change of state, whereas, for example, the messages are transmitted according to the same message cycle as before the changeover, for example, in the event of an attempted attack, the attack can be detected.

In some example embodiments, the communication rules predefine a change in a message cycle duration depending on a predefined event and the analysis determines whether the received messages are received according to the predefined change in the message cycle duration. An attack can be detected here if the attack does not participate in the change in the message cycle duration.

In some example embodiments, the communication rules predefine a restart of a message cycle depending on a predefined event and the analysis determines whether the received messages are received according to the message cycle restart. An attack can be detected here if the attack does not participate in the restart of the message cycle. It is furthermore possible to analyze whether the messages received before and after the restart have the same message content. Attacks can thus be detected in which the restart of the message cycle is participated in, but the message content is not changed.

In some example embodiments, the communication rules predefine a first message cycle and a second message cycle, wherein the second message cycle is shorter than the first message cycle, wherein messages are transmitted according to the second message cycle to indicate a change of state, wherein, following the end of the second message cycle, messages are transmitted according to the first message cycle, and wherein the analysis determines whether the messages are received according to these communication rules. Attacks can be detected here in which, for example, messages are transmitted according to the first message cycle only.

In some example embodiments, the communication rules predefine that a message cycle and a message content of a predefined message type are changed depending on a specific event, wherein the analysis determines whether the message content of the message type remains unchanged. Attacks can thus be detected which participate in the change in the message cycle, but do not make any change to the message content.

In some example embodiments, the attack detection method additionally comprises the output of a (warning) message if the messages have not been received according to the communication rules. The message can be used in many ways: to indicate that an attack has occurred, to deactivate safety-sensitive control units, to initiate countermeasures or further security measures, etc. This (warning) message can be output when a predefined number of messages are not received according to the communication rules. The predefined number can be based on predefined scenarios which result from the communication rules and according to which it is possible, for example, that even "correct" messages conflict with the communication rules concerned on the basis of special rules. As explained above, a change in a message cycle during specific events, or the transmission of messages outside the cycle, etc., may occur. Since scenarios of this type are exceptions, it is assumed in some example embodiments that, following the transmission of a few, for example, three, messages, the exceptional situation has passed and therefore the messages are again being transmitted according to the communication rules. If messages continue to be received other than according to the communication rules, i.e., more than the predefined number, it can be assumed that an attack has occurred.

Consequently, in some example embodiments, there are essentially three communication patterns which are defined by the communication rules and according to which messages are dispatched:
i) cyclic transmission, i.e., periodically with a fixed time interval,
ii) immediate transmission, for example, triggered by an event such as a change of state,
iii) function-dependent, e.g., more messages if a specific function is activated (e.g., indicator switched on or the like).

In some example embodiments, the analysis accordingly determines whether the received messages match (at least) one of these three communication patterns or a combination of these three communication patterns, and, if not, an attack is detected.

In some example embodiments, a prediction is furthermore made on the basis of the known communication rules as to when a next message will be received and what content it will have, i.e., for example, whether it will have the same message content as previous messages or a changed message content. In this way, attacks can be detected even in the case of more complex transmission patterns, such as those that may occur, for example, in the event of a change in the message cycle or the transmission of a plurality of messages to indicate a change of state.

Some example embodiments relate to an attack detection device for a bus system for a motor vehicle with a microprocessor, wherein the attack detection device is configured to receive messages via the bus system and the microprocessor is configured to carry out the attack detection method described above. The attack detection device may furthermore have an interface via which it is connected to the bus system and can communicate with other bus participants. The attack detection device may also have further functions, for example, those of a control unit or the like, and/or it may also perform further security-related functions, such as, for example, a firewall or the like. The attack detection device may also be provided as an additional device in the bus system.

Some example embodiments relate to a bus system for a motor vehicle with at least one bus line and a plurality of bus participants which exchange messages with one another via the bus line, wherein at least one bus participant is configured to carry out the attack detection method described above. The above details apply accordingly.

In some example embodiments, the attack detection method is implemented, for example, in a device such as a control unit or the like. The control unit may be an additional control unit which is provided in a bus system in addition to existing control units. The attack detection method may also be implemented in an already existing control unit of a bus system. As already also mentioned above, the attack detection method may furthermore be implemented in an attack detection device which is additionally designed, for example, as a firewall or gateway and is disposed, for example, between a first bus system section by which non-safety-critical messages are transmitted, and a second bus system section via which safety-critical messages are transmitted. An attack on the safety-critical section of the bus system, for example, via a bus participant, e.g., an infotainment system, which is disposed in the non-safety-critical section of the bus system, is thereby prevented. Attacks via such routes can thus also be blocked.

If it is implemented, for example, in an attack detection device designed as a gateway, the attack detection method may furthermore be configured to block a forwarding of a specific message or messages of a specific message type (e.g., a message with a specific CAN ID) if it has been detected that these messages or this message type is/are the subject of an attack.

In some example embodiments, the attack detection method is designed, for example, as a program code or as a computer program and is stored as software, e.g., on a computer-readable medium, in a file, or it is provided as a data stream, for example, via the Internet. Some disclosed embodiments relate accordingly to a computer-readable medium, a file, a data stream or the like which contains a program code which, if it is executed on a computer, processor or the like, causes the latter to carry out the attack detection method described herein.

Some example embodiments also relate to a motor vehicle with a bus system as described herein.

Figure 1:
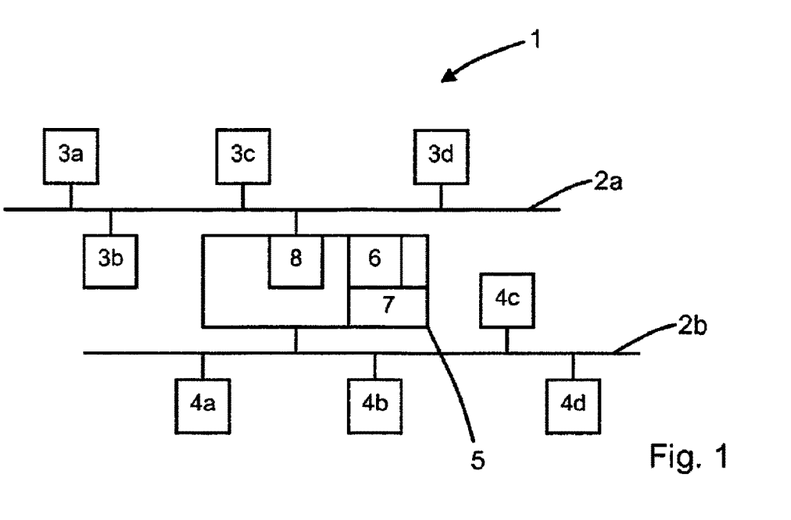
FIG. 1 shows schematically an example embodiment of a CAN bus system for a motor vehicle.

An example embodiment of a CAN bus system 1 is shown schematically in FIG. 1.

Here, the CAN bus system 1 has, by way of example, two line strands 2a and 2b, on which bus participants 3a to 3d and 4a to 4d and also a bus participant designed as a gateway control unit 5 are in each case disposed.

The bus participants 3a to 3d are connected to the first line strand 2a, wherein the bus participants relate to non-safety-critical functions of the motor vehicle and may be designed, for example, as a navigation device, a CD player, a display instrument, an infotainment system or as a light switch or the like.

The bus participants 4a to 4d are connected to the second line strand 2b, wherein the bus participants relate to safety-critical functions of the motor vehicle and the bus participants 4a to 4d are designed, for example, as an ABS control unit, a control unit for the electronic stability program or the like.

The gateway control unit 5 is disposed between the first 2a and the second 2b line strand of the CAN bus system 1 and contains, for example, a gateway and firewall functionality, so that it can block attempted attacks which are carried out via one of the bus participants 3a to 3d of the non-safety-critical line strand 2a by not transmitting, for example, corresponding messages from the first line strand 2a to the second line strand 2b. The gateway control unit 5 is furthermore configured to carry out the attack detection method described herein. The gateway control unit 5 thereby forms an attack detection device, which is also referred to below as the IDS 5 ("Intrusion Detection System"). Even if the gateway functionality is also implemented in the IDS 5 in this example embodiment, the disclosure is not limited in this respect. The IDS 5 may also be provided without a gateway functionality and may, for example, only carry out the attack detection method described herein.

The individual bus participants 3a-d and 4a-d and the IDS 5 can exchange CAN messages via the CAN bus system 1 or the lines 2a and 2b to which they are connected, as is also essentially known to the person skilled in the art.

The IDS 5, typically in the same way as the other bus participants 3a-d and 4a-d also, has a microprocessor 6 with a memory 7 and an interface 8 via which it can access the bus lines 2a and 2b and transmit and receive CAN messages.

As already explained above, CAN messages typically have an object identifier (referred to below as "CAN ID" or "ID" for short) which indicates the message type, and also a payload area, which is also referred to below as message content. The essential structure of a CAN bus system, the message transmission and the structure of the CAN messages are known to the person skilled in the art.

Some characteristics are typically visible on the CAN bus system 1, such as, for example, the ID, transmission type, cycle time, clock behavior, etc. Conversely, other characteristics are not visible, such as, for example, the blocking time, the sender of a message, the recipient, the meaning of the message content, etc.

It is assumed below in the embodiments, without restricting the generality, that the characteristics visible in the CAN bus system 1 are used, along with specifications known from the communication rules, such as the blocking time, etc. Furthermore, the following attacker model is assumed only by way of example for the following explanations, wherein the attacker (opponent), as is generally customary, is referred to as "Oscar":

Oscar has control of one of the bus participants 3a-d and 4a-d, e.g., the bus participant 3a.

Oscar can transmit and receive any CAN messages on the CAN bus system 1 with the bus participant 3a.

Oscar cannot remove, hold back or destroy any CAN messages from the other bus participants 3b-d and 4a-d with the bus participant 3a.

Oscar wishes to influence the other bus participants 3b-d and 4a-d and cause an unwanted behavior.

Even if Oscar has control here, by way of example, of the bus participant 3a, the disclosure is not limited in this respect, but rather Oscar could, for example, also gain access to the CAN bus system 1 with his own device (own control unit, computer with corresponding software, etc.).

In the example embodiment considered here, the IDS 5 consequently has access to the visible characteristics in the CAN bus system and the invisible characteristics which are defined in the communication rules (e.g., blocking time). In the example embodiment considered here, Oscar has access to the visible characteristics only, wherein the attack method described herein is also applicable and operates in cases where the attacker similarly (at least partially) knows the communication rules, e.g., the blocking time. The examples shown below therefore also take account of the fact that Oscar takes account of a blocking time.

Figure 2:
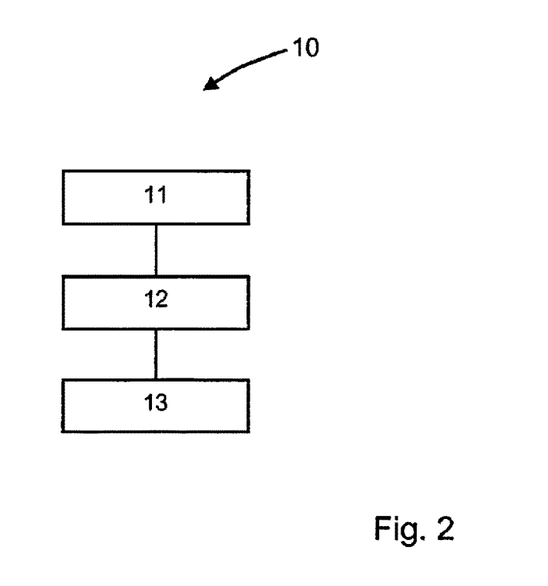
FIG. 2 shows schematically a flow diagram of an example embodiment of an attack detection method.

For the attack detection method 10 described below, for which FIG. 2 shows a flow diagram which the IDS 5 executes, the following assumptions are made, without limiting the generality, for a "defender model":

As explained, the IDS 5 is a dedicated bus participant (dedicated "ECU"—"electronic control unit", also referred to as a control unit) on the CAN bus system 1.

The IDS 5 can therefore also read all CAN messages on the CAN bus system 1.

The IDS 5 knows the message types (signal types) and their parameters for all CAN messages and the associated communication rules.

The IDS 5 would like to recognize every type of attack and can, if necessary, initiate countermeasures to prevent an unwanted behavior.

Mainly cyclic CAN messages are furthermore transmitted on the CAN bus system 1, i.e., messages which are transmitted periodically, so that it can be assumed that cyclic CAN messages are transmitted in the complete time period of the bus activity.

Oscar consequently has to transmit his attack messages in addition to the normal bus traffic of the CAN messages, and for this reason a violation of the communication rules is probable and his attacks are readily detectable.

The IDS 5 generally carries out the attack detection method explained below with reference to FIG. 2.

The attack detection method 10, which the IDS 5 carries out, receives, at 11, all CAN messages which are sent via the CAN bus system, wherein a filter or the like may essentially be provided so that only specific CAN messages are processed. A filter of this type may contain, for example, filter rules which filter out specific CAN messages, e.g., those which do not contain a corresponding ID or those whose ID is recorded in the filter.

At 12, it analyses whether the received CAN messages are received according to the known communication rules.

At 13, it outputs a message (warning signal) if the CAN messages have not been received according to the communication rules. This warning signal can be further used to take corresponding measures, as already explained above.

The mode of operation of the IDS 5 or, in particular, the analysis operation at 12 is explained below by way of example for five different CAN message types with reference to FIGS. 3a to 7f, without the disclosure being intended to be limited to these scenarios.

Figure 3A:
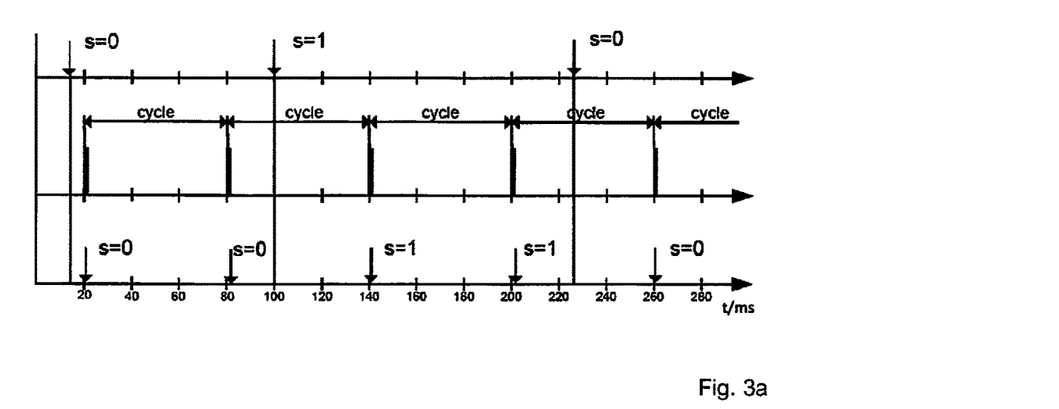
FIG. 3a shows the communication rules for a first message type.

FIG. 3a shows communication rules for CAN messages 20 (FIG. 3b, 3c) of a first message type. The time (t) is plotted in milliseconds (ms) on the x-axis of FIG. 3a, wherein events s=0 and s=1 are shown in the upper third of FIG. 3a, CAN messages are shown as vertical lines in the middle, the CAN messages being transmitted cyclically at a fixed interval ("cycle") of 60 ms and being received accordingly (at 20 ms, 80 ms, 140 ms, 200 ms, 260 ms), and the CAN message content s=0 and s=1, which changes according to the occurrence of an event, is shown in the lowermost area.

The communication rules for the first message type are such that the messages are transmitted cyclically, i.e., at regular intervals with a fixed cycle duration 21 (see also FIG. 3b, 3c, here 60 ms) for the status notification. These CAN messages 20 do not occur at other times outside the predefined cycle. Furthermore, as can also be seen in FIG. 3a, a change of state from s=0 to s=1 does not result in a change in the cycle, but rather the next CAN message to be transmitted according to the cycle then has the corresponding message content s=1 (see event s=1 at 100 ms, wherein the immediately next CAN message at 140 ms has the changed message content s=1, etc.).

The ID and the cycle duration can be regarded as parameters by the IDS 5.

Figure 3B:
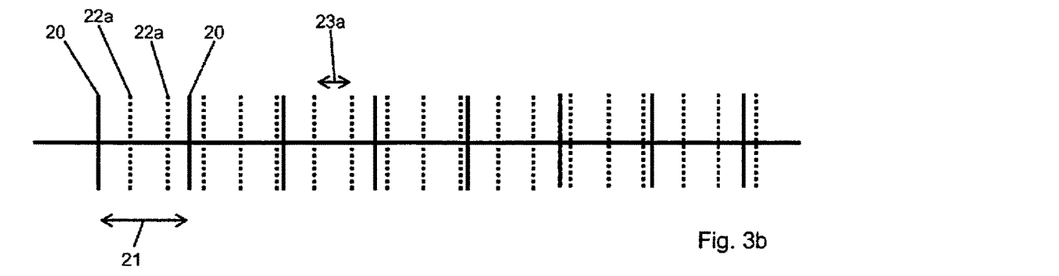
FIGS. 3b and 3c show messages and attack messages for the first message type.
Figure 3C:
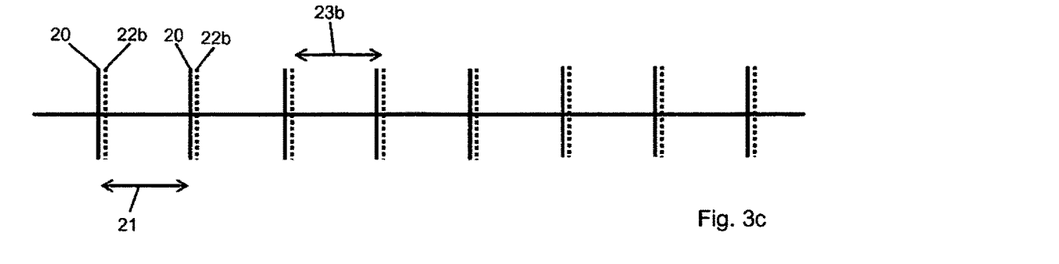

FIG. 3b shows a first attack scenario in which Oscar continuously transmits attack messages 22a, wherein he transmits these at a time interval 23a which is less than the cycle duration 21 of the CAN messages 20. CAN messages are generally shown in FIG. 3b-c and also in FIG. 4b-d, 5b-e, 6b-e and 7b-f as continuous lines, whereas attack messages are shown as dotted lines. The attack messages 22a have an ID which corresponds to the ID of the CAN messages 20 and have a message content desired by Oscar (e.g., payload content).

FIG. 3c shows a second attack scenario in which Oscar always transmits an attack message 22b immediately after a CAN message 20, wherein the attack messages 22b are transmitted with a cycle duration 23b which corresponds to the cycle duration 21 of the CAN messages 20. The attack messages 22b have an ID which corresponds to the ID of the CAN messages 20 and have a message content desired by Oscar.

In the second attack scenario, the aim, from Oscar's perspective, is to overwrite an original CAN message as quickly as possible with his own message and to control a bus participant for as long as possible with his message. If the original CAN message, for example, causes a light to be switched off in the passenger compartment of the vehicle, and corresponding following messages contain the "light off" state, Oscar could, with a corresponding message which has been transmitted immediately after the original CAN message to switch off the light, cause the light to be switched on and also to remain switched on until the next CAN message to switch the light off arrives.

The IDS 5 in each case checks the time between two consecutive messages and if it detects that the time interval between two consecutive messages does not match the predefined cycle duration 21, it emits a warning signal.

The IDS 5 establishes accordingly for the first scenario shown in FIG. 3a that significantly less time than the cycle duration 21 has elapsed between the first CAN message 20 and the first attack message 22a. The same applies to the time interval between the first attack message 22a and the second attack message 22a or for the time interval between the second attack message 22a and the second CAN message 20, etc.

A similar situation applies to the second scenario shown in FIG. 3b. There, the time duration between a CAN message 20 and the immediately following attack message 22b is always much shorter than the cycle duration 21, and the time duration between an attack message 22b and a following CAN message 20 is always a little shorter than the cycle duration 21, wherein the latter shortened cycle duration can be detected as still lying within a tolerance range.

Consequently, the IDS 5 immediately detects an attack by Oscar on messages of the first type if a time interval between two consecutive messages understeps the cycle time by more than a predefined tolerance (e.g., 10% of the cycle duration).

Oscar cannot therefore successfully feed in any messages whatsoever as long as the control unit (bus participant) concerned itself transmits the CAN messages of the first type, so that a detection rate of 100% applies here.

Confusion between an attack by Oscar and a malfunction can occur if a bus participant does not behave according to the communication rules and therefore shows a behavior which is detected by the IDS 5 as an attack. In such a case, a defective bus participant can be identified which may be helpful, e.g., during a development phase of the control unit.

Figure 4A:
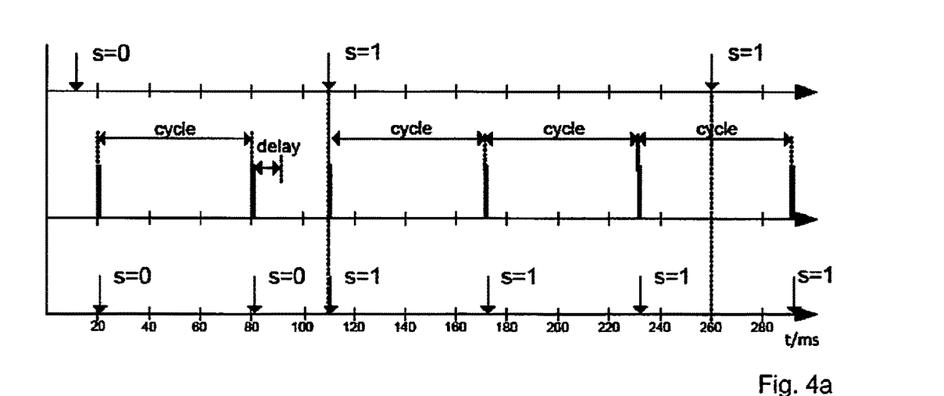
FIG. 4a shows the communication rules for a second message type.

FIG. 4a shows the communication rules for CAN messages of a second message type. The time (t) in milliseconds (ms) is again plotted on the x-axis of FIG. 4a, wherein events s=0 and s=1 are shown in the upper third of FIG. 4a, CAN messages are shown as vertical lines in the middle, the CAN messages being transmitted cyclically with a fixed interval ("cycle"), here 60 ms, and are received accordingly, and the CAN message content s=0 and s=1 is shown in the lowermost area. In the case of CAN messages of the second type, a status update can take place, wherein, in the event of a change of state, e.g., from s=0 to s=1, a message can be transmitted immediately after a predefined blocking time (also referred to as the inhibit time and indicated in FIG. 4a as "delay"). The predefined cycle duration, here 60 ms, is again maintained thereafter.

The ID, the cycle duration and the blocking time can be regarded as parameters by the IDS 5.

The communication rules for the second message type are therefore such that the CAN messages are transmitted essentially at regular intervals with a fixed cycle duration for the state notification. In the event of a change of state, the CAN messages are transmitted at irregular times to be able to (quickly) indicate the change of state. However, a predefined blocking time, here, for example, 10 ms, must be maintained. On completion of the update, i.e., after the change of state, the clock is restarted and the predefined cycle duration maintained.

Figure 4B:
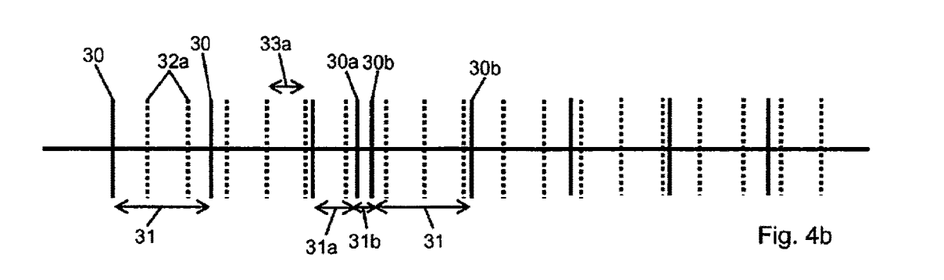
FIGS. 4b to 4d show messages and attack messages for the second message type.
Figure 4C:
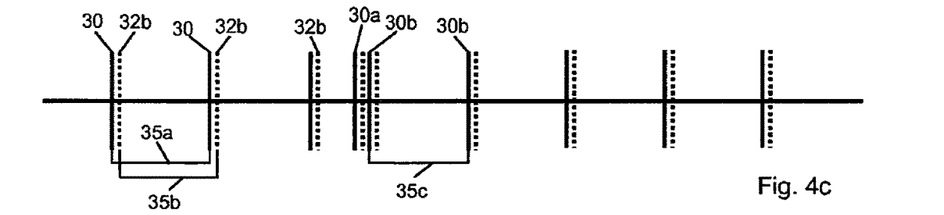
Figure 4D:
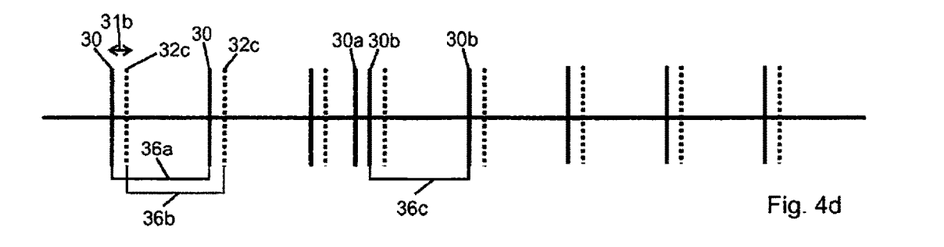

This is also shown in FIG. 4b-d. The CAN messages 30 are first transmitted with a cycle duration 31. This is followed by a CAN message 30a with an updated message content which is transmitted after a time interval 31b which is considerably shorter than the cycle duration 31. The CAN message 30a is followed on expiry of the blocking time 31b by a further CAN message 30b again with updated message content. The change of state is then completed and the CAN messages 30b are again transmitted with the predefined cycle duration 31.

FIG. 4b shows a first attack scenario which is similar to that shown in FIG. 3b and in which Oscar transmits attack messages 32a, continuously at a short time interval 33a, with the corresponding ID and the desired message content.

FIG. 4c shows a second attack scenario in which Oscar always transmits an attack message 32b immediately after a CAN message 30, 30a, 30b with the corresponding ID and the desired message content, and consequently ignores and understeps the blocking time 31b.

FIG. 4d shows a third attack scenario in which Oscar always transmits an attack message 32c with the corresponding ID and the desired message content after a CAN message 30, 30a, 30b, but takes account of the blocking time 31b.

The IDS 5 detects attacks in the case of CAN messages of the second type on the basis of three operations.

In a first operation, the IDS 5 in each case checks the time duration between two consecutive messages of the second type with identical message content (e.g., identical payload content). If no two identical messages are received according to the cycle duration (within the tolerance range), a warning signal is generated (this would be the case for the first scenario shown in FIG. 4b, since attack messages 42a with different message content occur there).

In a second operation, the IDS 5 in each case checks the time duration between two consecutive messages of the second type with different message content. If this time duration is less than the blocking time (minus the tolerance range), a warning message is generated (this would be the case for the first scenario shown in FIG. 4b and the second scenario shown in FIG. 4c, since the blocking time is regularly understepped there).

In a third operation, the IDS 5 makes a prediction for each CAN message based on the known cycle duration, predicting when the message will be repeated, insofar as no change of state occurs which results in a CAN message transmission outside the cycle duration. However, if a change of state is triggered in the interim period and the prediction is nevertheless correct, this is a suspicious behavior. If a suspicious behavior of this type is detected, e.g., three times in a short predefined time period, a warning signal is generated. In the present instance, this would be the case in the second scenario, see brackets 35a, 35b, 35c in FIG. 4c, and in the third scenario, see brackets 36a, 36b and 36c in FIG. 4d, wherein the brackets accordingly indicate suspicious cases and the third bracket 35c and 36c in each case indicates the respective third suspicious case which results in a warning signal.

The first and the second operations operate precisely and cannot be bypassed, thus resulting in a 100% detection rate. Confusion between attacks by Oscar and a malfunction of a bus participant may occur due to an irregular behavior of a bus participant, as has already been explained for the first type in connection with FIG. 3a-c.

The third operation will fail to detect an implanted attack message only if a change of state is subsequently triggered in the original bus traffic. In this case, Oscar can implant any number of new messages (taking account of operations 1 and 2), until a message is repeated in the original bus traffic.

To avoid detection, Oscar would consequently have to be able to see into the future, since he does not know when a message will be repeated.

False positives in the third operation can occur only through unfortunate timing, in which, for example, the change of state results in a CAN message transmission with a time interval such that a conspicuous behavior is detected three times. The probability of a coincidence of this type depends on the predefined tolerance and the remaining characteristics of the CAN messages and is generally to be assessed as very low and, it is highly improbable that a suspicious behavior of this type will occur three or four times within a short time.

Figure 5A:
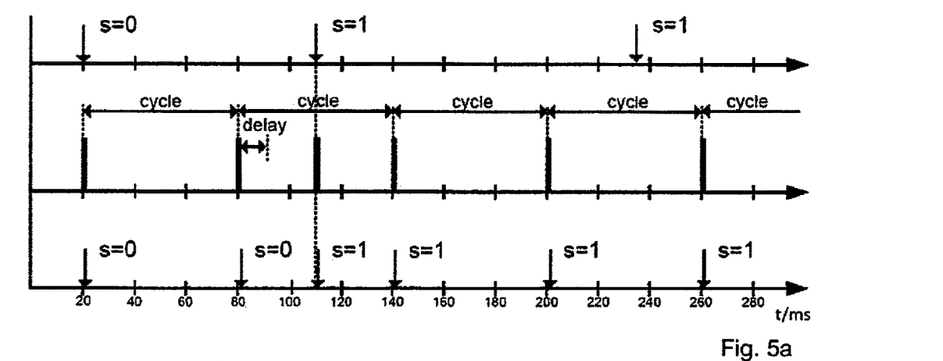
FIG. 5a shows the communication rules for a third message type.

FIG. 5a shows the communication rules for CAN messages of a third message type. The time (t) in milliseconds (ms) is again plotted on the x-axis in FIG. 5a, wherein events s=0 and s=1 are shown in the upper third of FIG. 5a, CAN messages are shown as vertical lines in the middle, the messages being transmitted cyclically at a fixed interval ("cycle") of, here, 60 ms and being received accordingly, and the CAN message content s=0 and s=1 is shown in the lowermost area. In the case of CAN messages of the third type, a status update can take place, wherein, in the event of a change of state of this type, e.g., from s=0 to s=1, a message can be transmitted immediately, taking account of the predefined blocking time (indicated in FIG. 5a as "delay"). However, the cycle duration is retained and the associated clock continues to run, as it were, in the background, so that the next CAN message in this example is again transmitted 60 ms after the CAN message which was transmitted before the CAN message triggered by the status change.

The ID, the cycle duration and the blocking time can be regarded as parameters by the IDS 5.

In the case of CAN messages of the third message type, the communication rules are such that the signals are transmitted at regular intervals with a predefined cycle duration for the state notification. The message cycle is retained even in the event of a change of state. A message which is triggered by the change of state is therefore transmitted between two messages which are transmitted in the cycle and according to the cycle duration. In other words, the transmission clock of the CAN messages is continued at the old cadence following a change of state of this type, as also shown in FIG. 5a.

Figure 5B:
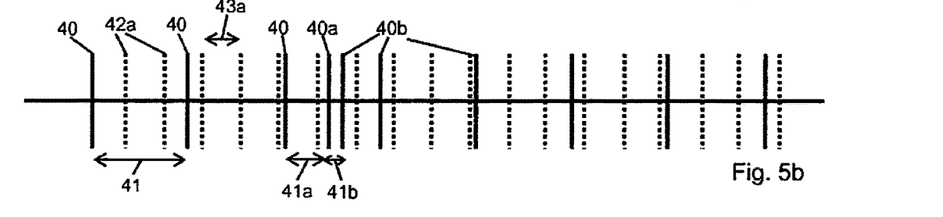
FIGS. 5b to 5e show messages and attack messages for the third message type.
Figure 5C:
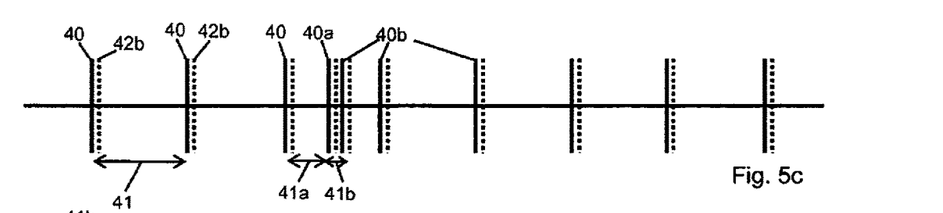
Figure 5D:
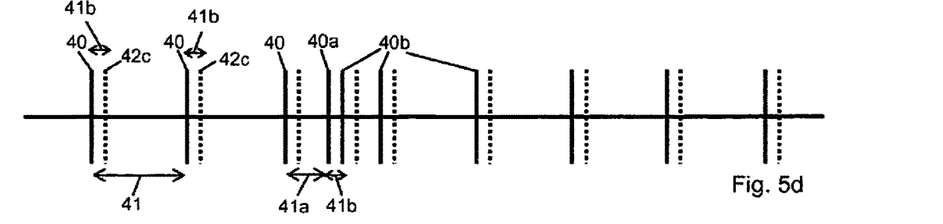

This is also shown in FIG. 5b-d. CAN messages 40 are first transmitted with a cycle duration 41. This is followed by a CAN message 40a which is transmitted after a time interval 41a after a CAN message 40, the time interval being significantly shorter than the cycle duration 41 and being triggered by a change of state. The CAN message 40a is followed at the end of the blocking time 41b by a further CAN message 40b which is triggered by a further change of state. The change of state is then completed and the CAN messages 40b are again transmitted with the predefined cycle duration 41 according to the old cadence which continues to run, as it were, in the background, so that the last CAN message 40 before the change of state and the first CAN message 40b after the completion of the change of state are transmitted at the interval of the cycle duration 41.

FIG. 5b shows a first attack scenario which is similar to that shown in FIG. 3b and in which Oscar transmits attack messages 42a with the corresponding ID and the desired message content continuously, at a short time interval 43a.

FIG. 5c shows a second attack scenario in which Oscar always transmits an attack message 42b with the corresponding ID and the desired message content immediately after a CAN message 40, 40a, 40b and consequently ignores and understeps the blocking time 41b.

FIG. 5d shows a third attack scenario in which Oscar always transmits an attack message 42c with the corresponding ID and the desired message content after a CAN message 40, 40a, 40b, but takes account of the blocking time 41b.

Figure 5E:
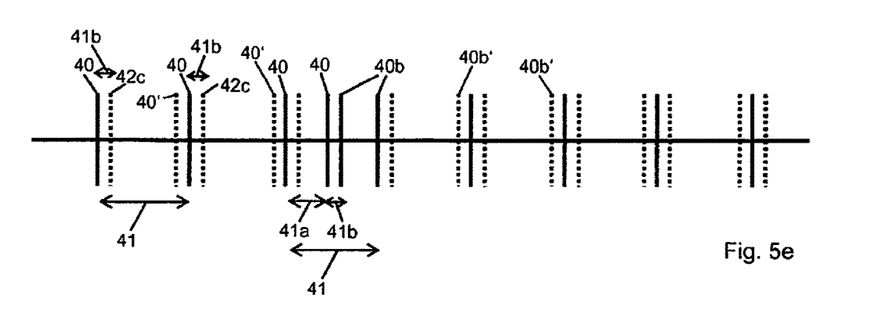

FIG. 5e shows a fourth attack scenario in which Oscar carries out the third attack scenario and transmits attack messages 42d accordingly, but always repeats a current, original CAN message 40' and 40b' shortly before the next clock, taking account of the blocking time 41b (these messages 40' and 40b' are shown as continuous lines, since they correspond to the real CAN messages 40 and 40b).

The IDS 5 performs the detection of attacks on CAN messages of the third message type on the basis of four operations:

In the first operation, the IDS 5 in each case checks the time duration between two consecutive messages of the third type with identical message contents and in each case checks the current status rule and increases the status:

Status 0: blocking time must be maintained
Status 1: cycle duration must be maintained, but may be reduced by the blocking time
Status 2: cycle duration must be maintained In the second operation, the IDS 5 in each case checks the time duration between two consecutive messages of the third type with different message contents. If this time duration is less than the blocking time (minus the tolerance range), a warning signal is generated.

In the third operation, the IDS 5 attempts to find the clock if no change of state is then taking place (idle phase) and makes a prediction that the CAN message will be repeated with identical message content at the next clock time, i.e., at the end of a cycle duration. If a change of state is triggered, the message content of the expected CAN message is updated. If the prediction is not correct, i.e., the last message is not repeated with identical message content, a warning signal is generated.

In the fourth operation, the IDS 5 checks whether a plurality of changes of state are triggered during a message cycle and whether the last CAN message again contains the old message content. If this happens four times in succession, a warning signal is generated.

The first detection operation operates precisely as soon as status 1 comes into effect. In status 0, Oscar can implant messages after a change of state event for the remainder of the cycle duration (insofar as no further event occurs). However, since the length of this time window is, on one occasion at most, equal to a time duration of the cycle time minus three times the blocking time, not to be detected by operation at 3, this is to be categorized as safe.

The second operation operates precisely and the detection rate is 100%. Confusion between attacks by Oscar and the malfunction of a bus participant may occur, as mentioned, only due to irregular behavior of the corresponding bus participant.

The third detection operation reliably helps against a plurality of attacks, but has the following weaknesses. If Oscar is present from the outset, he can prevent a clock from being found and can thereby totally eliminate the third detection operation.

Furthermore, Oscar can bypass the first to third detection operations completely with the fourth attack scenario (e.g., in idle phases or with very good timing).

The third operation also has 0% false positives if the correct clock is found. Confusion between attacks by Oscar and a bus participant may occur, as mentioned, due to an irregular behavior of a bus participant.

The fourth detection operation detects all further known attacks. However, since the fourth attack scenario may correspond, for example, to regular but highly improbable behavior of a bus participant (control unit), this may also result in false positives. However, the probability of a plurality of changes of state per cycle being triggered four times in succession, wherein the last message repeats the old CAN message, is very low.

Figure 6A:
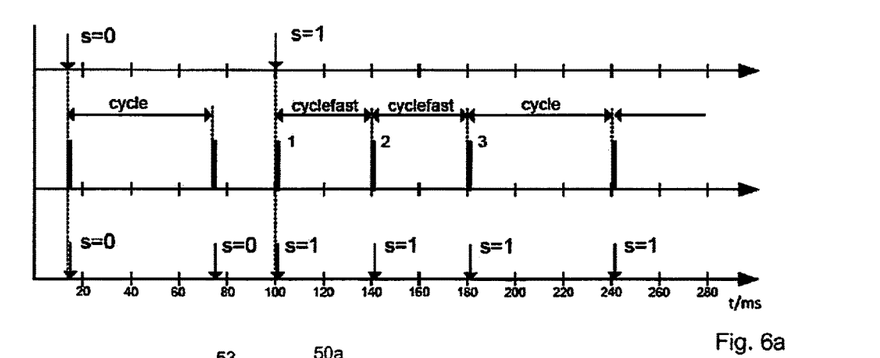
FIG. 6a shows the communication rules for a fourth message type.

FIG. 6a shows the communication rules for CAN messages of a fourth message type. The time (t) in milliseconds (ms) is again plotted on the x-axis of FIG. 6a, wherein events s=0 and s=1 are shown in the upper third, CAN messages are shown as vertical lines in the middle, the messages being transmitted cyclically at a fixed interval ("cycle") of, here, 60 ms and being received accordingly, and the CAN message content s=0 and s=1 is shown in the lowermost area. In the case of CAN messages of the fourth type, a status update can take place, wherein, in the event of a change of state of this type, e.g., from s=0 to s=1, a message can be transmitted immediately after a predefined blocking time. The change of state is shown by a shorter cycle duration ("cyclefast"), wherein the new CAN message is repeated multiple times with this shorter cycle duration. The predefined (old) cycle duration, here 60 ms, is again maintained thereafter.

The IDS 5 can regard the ID, cycle duration, blocking time, shorter cycle duration (fast) and repetitions of the same message as parameters.

In the case of CAN messages of the fourth message type, the communication rules are such that the CAN messages of the fourth type are transmitted at regular intervals with the same cycle duration for the state notification. Changes of state at irregular times are possible, wherein a change of state of this type is indicated by multiple transmission of a CAN message with updated message content with a faster clock, i.e., with a shorter cycle duration. The original main clock with the predefined cycle duration is restarted on completion of the change of state.

Figure 6B:
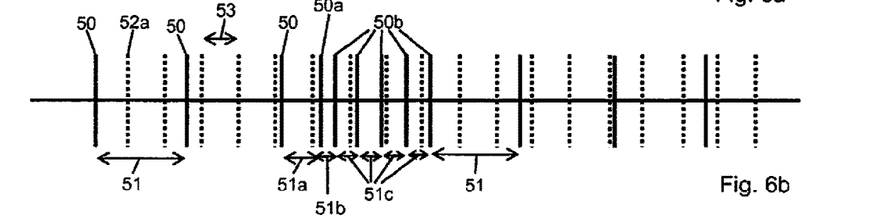
FIGS. 6b to 6e show messages and attack messages for the fourth message type.
Figure 6C:
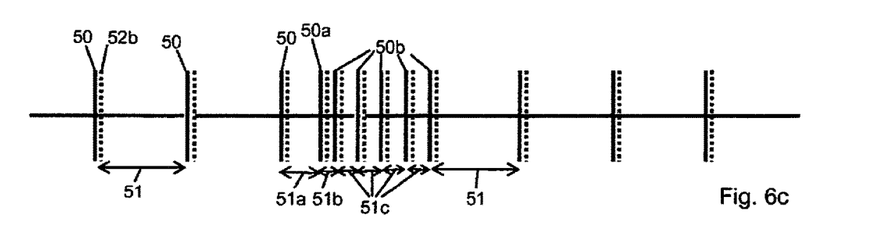
Figure 6D:
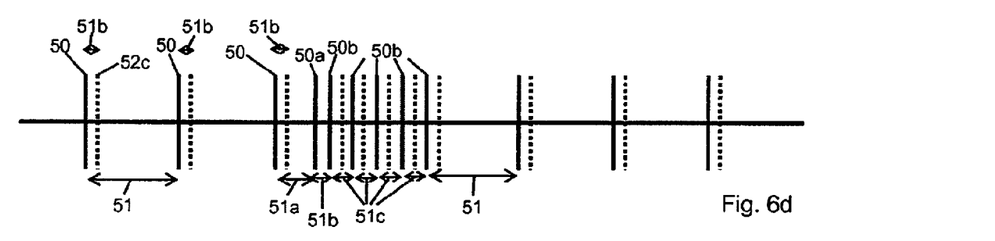

This is also shown in FIG. 6b-d. CAN messages 50 are first transmitted with a cycle duration 51. This is followed by a CAN message 50a which is transmitted after a time interval 51a after a CAN message 50, the time interval being significantly shorter than the cycle duration 51, and which triggers a change of state. The CAN message 50a is followed at the end of the blocking time 51b by a plurality (here five) of CAN messages 50b which are triggered by a further change of state, wherein the CAN messages 50b are transmitted with a fast cycle duration 51c which is significantly shorter than the previous cycle duration 51. The change of state is then completed and the CAN messages 50b are again transmitted according to the predefined cycle duration 51 which restarts, as it were, with the last CAN message 50b which was transmitted with the short cycle duration 512c.

FIG. 6b shows a first attack scenario in which Oscar continuously (see also FIG. 3b, 4b, 5b) transmits attack messages 52a with the corresponding ID and the desired message content at a short time interval 53a.

FIG. 6c shows a second attack scenario in which Oscar always transmits an attack message 52b with the corresponding ID and the desired message content immediately after a CAN message 50, 50a, 50b, and consequently ignores and understeps the blocking time 51b (see also FIGS. 3c, 4c and 5c).

FIG. 6d shows a third attack scenario in which Oscar always transmits an attack message 52c with the corresponding ID and the desired message content after a CAN message 50, 50a, 50b, but takes account of the blocking time 51b (see also FIGS. 4d and 5d).

Figure 6E:
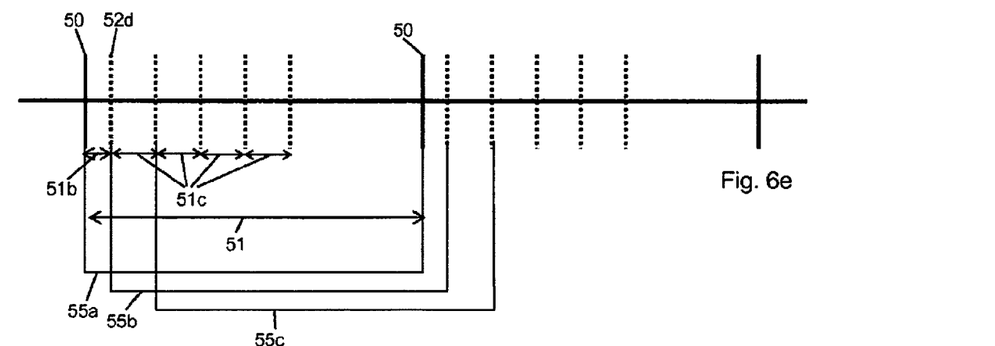

FIG. 6e shows a fourth attack scenario in which Oscar carries out the third attack scenario and correspondingly transmits attack messages 52d, here in each case five messages, according to the fast cycle duration 51c. Oscar does not intervene in the event of a change of state.

The IDS 5 performs a detection of attacks on CAN messages of the fourth type based on three operations:

In a first operation, the IDS 5 in each case checks the time between two consecutive CAN messages with identical message content (e.g., payload content). If this time does not correspond to the cycle duration 51 (within the tolerance range), a warning signal is generated. However if message repetitions are active after a change of state, the fast cycle duration 51c is checked instead of the normal cycle duration 51. Attack scenarios one to three can thereby be detected.

In a second operation, the IDS 5 in each case checks the time between two consecutive messages of the fourth type with different message content (e.g., payload content). If this time is less than the blocking time 51b (minus the tolerance range), a warning message is generated. Attack scenarios one and two can thereby be detected.

In a third operation, the IDS 5 makes a prediction for each CAN message, predicting when it will be repeated. However, if a change of state is triggered after all in the interim period and the prediction is nevertheless correct, this is a suspicious behavior, as in the case of the fourth attempted attack (FIG. 5e). In the event of threefold suspicious behavior (see brackets 55a, 55b, 55c) within a short time period, a warning signal is generated. If messages are transmitted repeatedly due to the change of state, along with the normal prediction for the normal cycle duration 51, a prediction is also made for the short cycle duration 51c and is similarly checked. Attack scenarios one to four can thereby be detected.

The first and the second detection operations operate precisely and cannot be bypassed, so that a detection rate of 100% and a false positive rate of 0% are achieved. Confusion between attacks by Oscar and the malfunction of a bus participant may occur, as mentioned, due to irregular behavior of a bus participant.

The third detection operation will fail to detect an implanted attack message only if a change of state is subsequently triggered in the original bus traffic. To exploit this, Oscar would have to be able to see into the future, which would only be possible if Oscar had control, for example, of the IDS 5.

False positives in the third detection operation can occur through unfortunate timing, if, for example, a CAN message which is transmitted according to the short cycle duration 51c coincidentally has a time interval according to the normal cycle duration 51 in relation to a preceding CAN message.

Due to the double predictions in areas in which a change of state is currently taking place and the resulting clock overshadowing, the probability of false positives is slightly higher here than in the case of messages of the second type. However, the probability of a behavior of this type occurring three or four times in succession within a short time is low.

Figure 7A:
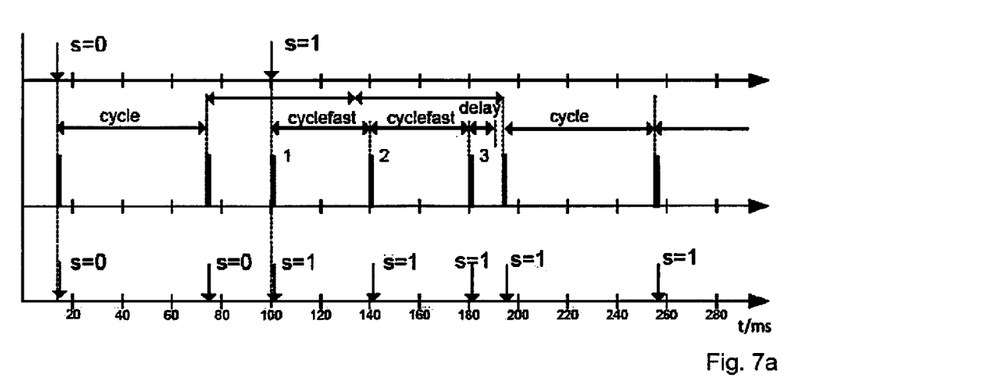
FIG. 7a shows the communication rules for a fifth message type.

FIG. 7a shows the communication rules for CAN messages of a fifth message type. The time (t) in milliseconds (ms) is again shown on the x-axis of FIG. 7a, wherein events s=0 and s=1 are shown in the upper third of FIG. 7a, CAN messages are shown as vertical lines in the middle, the messages being transmitted cyclically at a fixed interval ("cycle") of, here, 60 ms and being received accordingly, and the CAN message content s=0 and s=1 is shown in the lowermost area. In the case of CAN messages of the fifth type, a status update can take place, wherein, in the event of a change of state, e.g., from s=0 to s=1, a message is transmitted multiple times according to a fast cycle duration ("cyclefast"). On completion of the change of state and taking account of the predefined blocking time ("delay"), the CAN messages are transmitted in accordance with the old cadence, i.e., the old clock with a cycle duration of 60 ms runs, as it were, in the background during the change of state and is then resumed.

The IDS 5 can regard the ID, cycle duration, blocking time, shorter cycle duration (fast) and repetitions of the same message as parameters.

In the case of CAN messages of the fifth message type, the communication rules are such that the CAN messages of the fifth type are transmitted at regular intervals with the same cycle duration for the state notification. Changes of state at irregular times are possible, wherein a change of state of this type is indicated by multiple transmission of a CAN message with updated message content with a faster clock, i.e., with a shorter cycle duration. The original main clock with the predefined cycle duration is continued on completion of the change of state.

This is also shown in FIG. 7b-f. CAN messages 60 are first transmitted with a cycle duration 61. This is followed by a CAN message 60a which is transmitted after a time interval 61a after a CAN message 60, the time interval being significantly shorter than the cycle duration 61, and which triggers a change of state. The CAN message 60a is followed at the end of the blocking time 61b by a plurality (here five) of CAN messages 60b which are triggered by a further change of state, wherein the CAN messages 60b are transmitted with a fast cycle duration 61c which is significantly shorter than the previous cycle duration 61. The change of state is then completed and the CAN messages 60b are again transmitted according to the cadence continuing to run in the background with the predefined cycle duration 61.

Figure 7B:
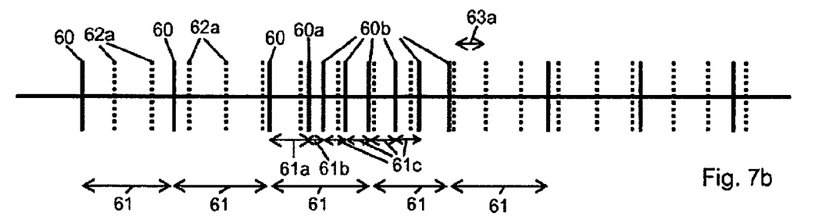
FIGS. 7b to 7f show messages and attack messages for the fifth message type.

FIG. 7b shows a first attack scenario in which Oscar continuously (see also FIG. 3b, 4b, 5b, 6b) transmits attack messages 62a with the corresponding ID and the desired message content at a short time interval 63a.

Figure 7C:
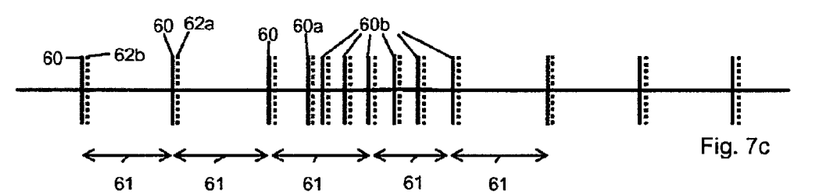

FIG. 7c shows a second attack scenario in which Oscar always transmits an attack message 62b with the corresponding ID and the desired message content immediately after a CAN message 60, 60a, 60b, and consequently ignores and understeps the blocking time 61b (see also FIGS. 3c, 4c, 5c and 6c).

Figure 7D:
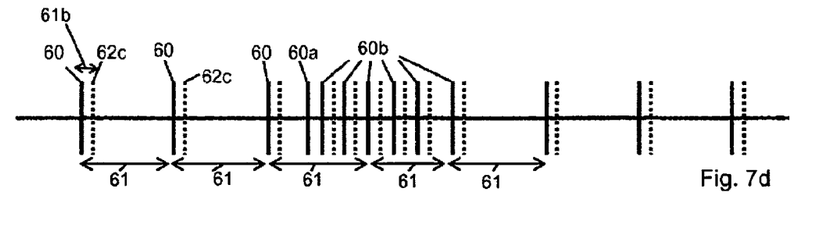

FIG. 7d shows a third attack scenario in which Oscar always transmits an attack message 62c with the corresponding ID and the desired message content after a CAN message 60, 60a, 60b, but takes account of the blocking time 61b (see also FIGS. 4d, 5d and 6d).

Figure 7E:
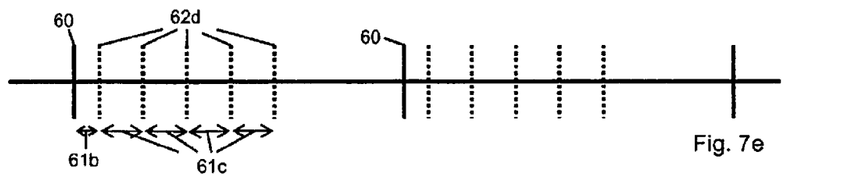

FIG. 7e shows a fourth attack scenario in which Oscar carries out the third attack scenario and correspondingly transmits attack messages 62d, here in each case five messages, according to the fast cycle duration 61c. Oscar does not intervene in the event of a change of state.

Figure 7F:
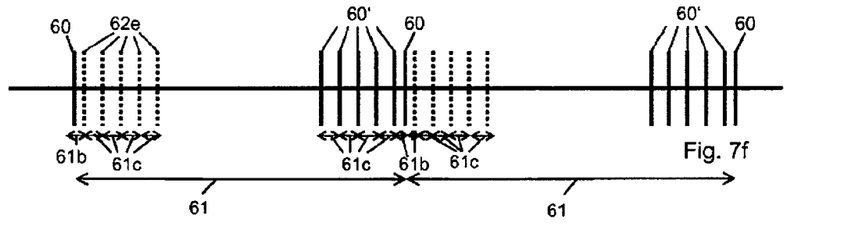

FIG. 7f shows a fifth attack scenario in which Oscar carries out the fourth attack scenario, but, repeatedly before the next clock, repeats the original message multiple times with the fast cycle duration (here five times 60'). He does not intervene in the event of an original change of state.

The detection of attacks on CAN messages of the fifth type by the IDS 5 is based on four operations:

In the first operation, the IDS 5 in each case checks the time duration between two consecutive messages of the fifth type with identical message content (e.g., payload content), in each case checks the current status rule and increases the status:

Status 0: blocking time must be maintained

Status 1: cycle duration must be maintained, but may be shortened

Status 2: cycle duration must be maintained, exception: if repetitions are active after a change of state, the short (fast) cycle duration is checked instead of the normal cycle duration (without status—always absolute). The first operation detects the attack scenarios one to three.

In the second detection operation, the IDS 5 in each case checks the time between two consecutive messages of the fifth type with different message content (e.g., payload content). If this time is less than the blocking time (minus the tolerance range), a warning signal is generated. The second operation detects attack scenarios one and two.

In the third operation, the IDS 5 attempts to find the clock, wherein this takes place in the idle phase in which no change of state is active, and it makes a prediction that the message will be repeated with the same message content with the next clock. If a change of state is triggered, the expected message content is updated. If the prediction is not correct, i.e., the last message is not repeated, a warning signal is generated. The third operation detects attack scenarios one to four.

In the fourth operation, the IDS 5 checks whether a plurality of changes of state are triggered during a clock cycle and whether the last message again repeats the old CAN message with identical message content. If this happens five times in succession, a warning signal is generated. The fourth operation detects attack scenario five.

The first detection operation at 1 operates precisely as soon as status 1 comes into effect. In status 0, Oscar can implant messages after a change of state event for the remainder of the cycle duration, insofar as no further change of state occurs. However, the risk of Oscar succeeding in this is very low due to the other provided operations and given constraints. The false positives rate is 0%. Confusion may occur, as mentioned, due to an irregular behavior of a transmitter.

The second operation 2 operates precisely and has a 100% detection rate and a 0% false positives rate. Confusion may occur, as mentioned, due to an irregular behavior of a transmitter.

The third detection operation reliably helps against a plurality of attacks, but may have weaknesses. If, for example, Oscar is present from the outset, he can prevent a clock from being found and can totally eliminate the detection by transmitting corresponding messages. Furthermore, Oscar can completely bypass the first to third detection operation with the fifth attack scenario (in idle phases without a change of state). However, if the correct clock is found, the false positives rate is 0%. Confusion may occur, as mentioned, due to an irregular behavior of a transmitter.

The fourth detection operation detects all further known attacks by Oscar. However, since the fifth attack scenario corresponds to a regular (but highly improbable) behavior of a bus participant, it can also result in false positives. However, the probability of a plurality of changes of state per clock being triggered five times in succession, wherein the last CAN message repeats the old message before the change of state, is very low.

REFERENCE NUMBER LIST

1 Bus system for motor vehicle
2, 2b Bus lines
3a-d Bus participants (non-safety-critical)
4a-d Bus participants (safety-critical)
5 IDS, attack detection device
6 Microprocessor
7 Memory
8 Interface
10 Attack detection method
11 Message reception operation
12 Analysis operation
13 Output of a message
20 CAN message of a first type
21 Cycle duration of 20
22a,b Attack messages
23a,b Cycle duration of attack messages
30a,b CAN message of a second type
31 Cycle duration of 30
31a Time interval
31b Blocking time
32a,b,c Attack messages
33a Cycle duration of attack messages
35a-c Suspicious behavior
36a-c Suspicious behavior
40a,b CAN message of a third type
40', 40b' Message copy of 40, 40b
41 Cycle duration of 40
41a Time interval
41b Blocking time
42a,b,c,d Attack messages
43a Cycle duration of attack messages
50a,b CAN message of a fourth type
51 Cycle duration of 50
51a Time interval
51b Blocking time
51c Short cycle duration
52a,b,c,d Attack messages
53a Cycle duration of attack messages
55a,b,c Suspicious behavior
60a,b CAN message of a fifth type
60' Message copy of 60
61 cycle duration of 60
61a Time interval
61b Blocking time
61c Short cycle duration
62a,b,c,d,e Attack messages
63a Cycle duration of attack messages

The invention claimed is:

1. An attack detection method for a bus system of a motor vehicle, wherein communication rules are defined for the transmission of messages, the attack detection method comprising:

receiving messages sent via the bus system; and
analyzing whether the received messages are received according to the communication rules,
wherein the communication rules predefine a first message cycle and a second message cycle, wherein the second message cycle is shorter than the first message cycle, wherein messages are transmitted according to the second message cycle to indicate a change of state,
wherein, at the end of the second message cycle, messages are transmitted according to the first message cycle, and
wherein the analysis determines whether the messages are received according to these communication rules.

2. The attack detection method of claim 1, wherein different communication rules are defined for different message types and the method further comprises analyzing messages of a specific message type.

3. The attack detection method of claim 1, wherein the communication rules predefine a fixed message transmission cycle and the analysis determines whether the messages have been received according to the fixed message transmission cycle.

4. The attack detection method of claim 1, wherein the communication rules predefine a blocking time between two consecutive messages and the analysis determines whether two consecutive messages are received according to the predefined blocking time.

5. The attack detection method of claim 4, wherein the analysis determines whether the message content of two consecutive messages is identical.

6. The attack detection method of claim 1, wherein the communication rules predefine a changeover of a message cycle depending on a predefined event and the analysis determines whether the received messages are received according to the predefined changeover of the message cycle.

7. The attack detection method of claim 1, wherein the communications rules predefine a change in a message cycle duration depending on a predefined event and the analysis determines whether the received messages are received according to the predefined change in the message cycle duration.

8. The attack detection method of claim 1, wherein the communication rules predefine a restart of a message cycle depending on a predefined event, and the analysis determines whether the received messages are received according to the restart of the message cycle.

9. The attack detection method of claim 8, wherein the analysis determines whether the received messages have the same message content before and after the restart of the message cycle.

10. The attack detection method of claim 1, wherein the communication rules predefine that a message cycle and the method further comprises changing a message content of a predefined message type depending on a specific event, wherein the analysis determines whether the message content of the message type remains unchanged.

11. The attack detection method of claim 1, further comprising outputting a message in response to the messages having not been received according to the communication rules.

12. The attack detection method of claim 11, wherein the message is output in response to a predefined number of messages not being received according to the communication rules.

13. An attack detection device for a bus system for a motor vehicle, comprising: a microprocessor, wherein the attack detection device receives messages via the bus system and the microprocessor carries out an attack detection method for the bus system of the motor vehicle, wherein communication rules are defined for the transmission of messages, the attack detection method comprising receiving messages sent via the bus system, and analyzing whether the received messages are received according to the communication rules, wherein the communication rules predefine a first message cycle and a second message cycle, wherein the second message cycle is shorter than the first message cycle, wherein messages are transmitted according to the second message cycle to indicate a change of state, wherein, at the end of the second message cycle, messages are transmitted according to the first message cycle, and wherein the analysis determines whether the messages are received according to these communication rules.

14. The device of claim 13, wherein different communication rules are defined for different message types and messages of a specific message type are analyzed.

15. The device of claim 13, wherein the communication rules predefine a fixed message transmission cycle and the analysis determines whether the messages have been received according to the fixed message transmission cycle.

16. The device of claim 13, wherein the communication rules predefine a blocking time between two consecutive messages and the analysis determines whether two consecutive messages are received according to the predefined blocking time.

17. The device of claim 16, wherein the analysis determines whether the message content of two consecutive messages is identical.

18. The device of claim 13, wherein the communication rules predefine a changeover of a message cycle depending on a predefined event and the analysis determines whether the received messages are received according to the predefined changeover of the message cycle.

19. The device of claim 13, wherein the communications rules predefine a change in a message cycle duration depending on a predefined event and the analysis determines whether the received messages are received according to the predefined change in the message cycle duration.

20. The device of claim 13, wherein the communication rules predefine a restart of a message cycle depending on a predefined event, and the analysis determines whether the received messages are received according to the restart of the message cycle.

21. The device of claim 20, wherein the analysis determines whether the received messages have the same message content before and after the restart of the message cycle.

22. The device of claim 13, wherein the communication rules predefine that a message cycle and the method further comprises changing a message content of a predefined message type depending on a specific event, wherein the analysis determines whether the message content of the message type remains unchanged.

23. The device of claim 13, wherein the method further comprises outputting a message in response to the messages having not been received according to the communication rules.

24. The device of claim 23, wherein the message is output in response to a predefined number of messages not being received according to the communication rules.

25. A bus system for a motor vehicle, comprising at least one bus line and a plurality of bus participants which exchange messages with one another via the bus line, wherein at least one bus participant carries out an attack detection method for the bus system of the motor vehicle, wherein communication rules are defined for the transmission of messages, the attack detection method comprising receiving messages sent via the bus system, and analyzing whether the received messages are received according to the communication rules, wherein the communication rules predefine a first message cycle and a second message cycle, wherein the second message cycle is shorter than the first message cycle, wherein messages are transmitted according to the second message cycle to indicate a change of state, wherein, at the end of the second message cycle, messages are transmitted according to the first message cycle, and wherein the analysis determines whether the messages are received according to these communication rules.

26. The bus system of claim 25, wherein different communication rules are defined for different message types and messages of a specific message type are analyzed.

27. The bus system of claim 25, wherein the communication rules predefine a fixed message transmission cycle and the analysis determines whether the messages have been received according to the fixed message transmission cycle.

28. The bus system of claim 25, wherein the communication rules predefine a blocking time between two consecutive messages and the analysis determines whether two consecutive messages are received according to the predefined blocking time.

29. The bus system of claim 28, wherein the analysis determines whether the message content of two consecutive messages is identical.

30. The bus system of claim 25, wherein the communication rules predefine a changeover of a message cycle depending on a predefined event and the analysis determines whether the received messages are received according to the predefined changeover of the message cycle.

31. The bus system of claim 25, wherein the communications rules predefine a change in a message cycle duration depending on a predefined event and the analysis determines whether the received messages are received according to the predefined change in the message cycle duration.

32. The bus system of claim 25, wherein the communication rules predefine a restart of a message cycle depending on a predefined event, and the analysis determines whether the received messages are received according to the restart of the message cycle.

33. The bus system of claim 32, wherein the analysis determines whether the received messages have the same message content before and after the restart of the message cycle.

34. The bus system of claim 25, wherein the communication rules predefine that a message cycle and the method further comprises changing a message content of a predefined message type depending on a specific event, wherein the analysis determines whether the message content of the message type remains unchanged.

35. The bus system of claim 25, wherein the method further comprises outputting a message in response to the messages having not been received according to the communication rules.

36. The bus system of claim 35, wherein the message is output in response to a predefined number of messages not being received according to the communication rules.

* * * * *